UNITED STATES PATENT OFFICE.

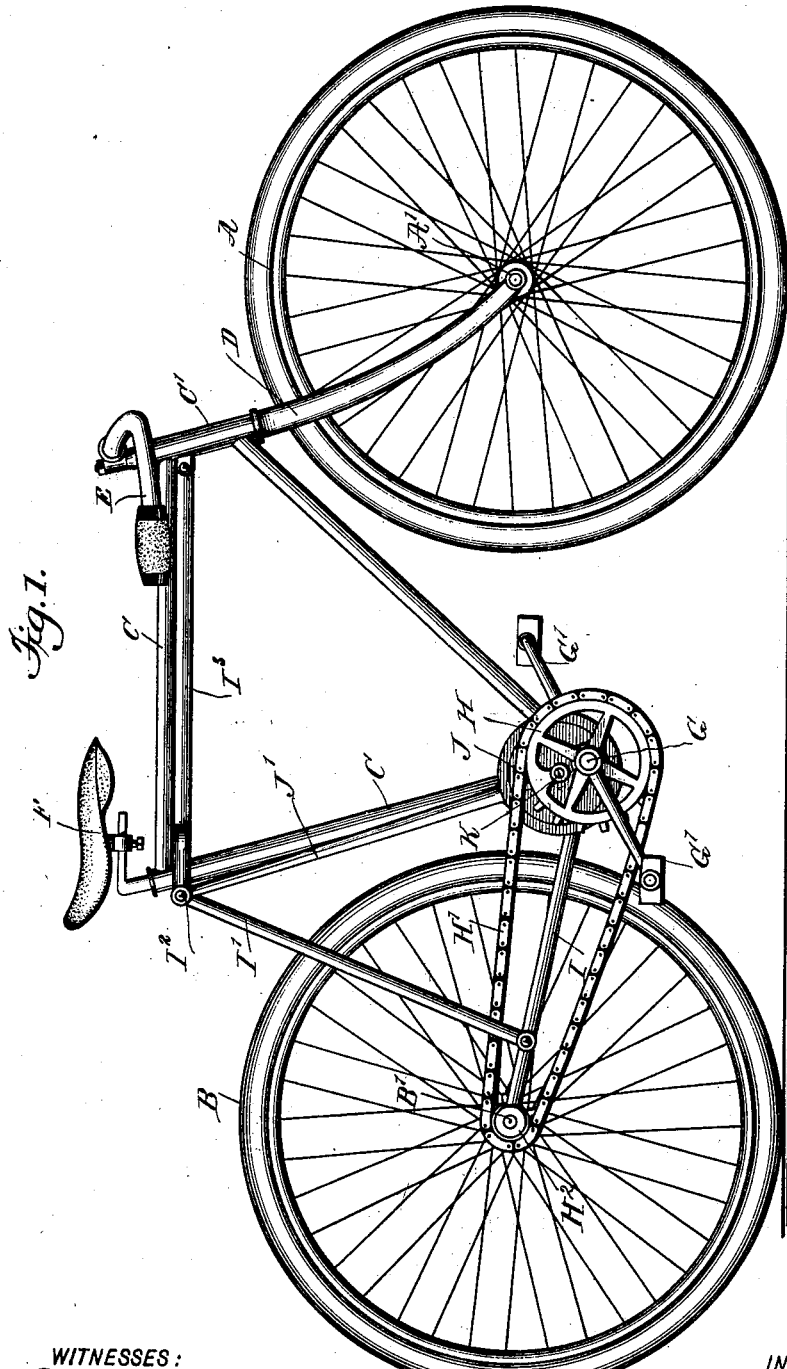

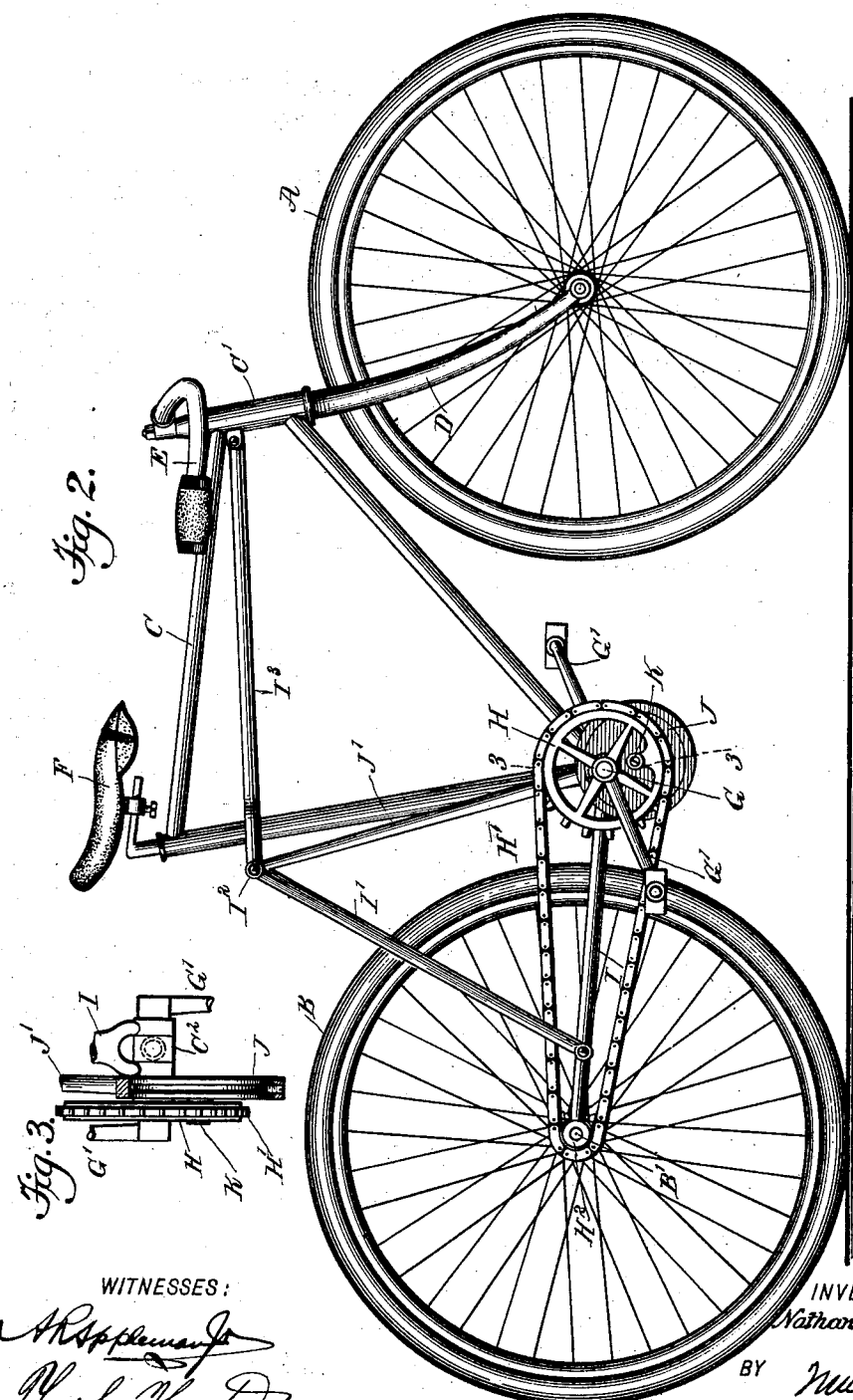

NATHANIEL ELMER BROWN, OF AITKIN, MINNESOTA.

BICYCLE.

SPECIFICATION forming part of Letters Patent No. 696,310, dated March 25, 1902.

Application filed September 20, 1901. Serial No. 75,666. (No model.)

*To all whom it may concern:*

Be it known that I, NATHANIEL ELMER BROWN, a citizen of the United States, and a resident of Aitkin, in the county of Aitkin and State of Minnesota, have invented a new and Improved Bicycle, of which the following is a full, clear, and exact description.

The object of the invention is to provide a new and improved bicycle arranged to allow of riding the machine in the usual manner and to permit of quickly changing the machine to give the rider a forward-and-backward canter of the body with an impelling and resisting impulse, producing a very novel and exhilarating motion.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a like view of the same with parts in a different position, and Fig. 3 is an enlarged transverse section of the same on the line 3 3 of Fig. 2.

The bicycle consists, essentially, of a front or steering wheel A, a rear or drive wheel B, a main frame C, having a head C', in which is journaled the front fork D, carrying the usual handle-bar E under the control of the operator seated on the seat F, carried on the main rigid frame C. In the crank-hanger $C^2$ of this frame C is journaled a crank-shaft G, carrying the usual crank-arms G', having pedals adapted to be engaged by the rider's feet, and on the said shaft G is secured a sprocket-wheel H, connected by a sprocket-chain H' with a sprocket-wheel $H^2$ on the axle B' of the drive-wheel B, so that when the pedals are actuated a forward propelling of the bicycle takes place in the usual manner. An auxiliary frame is pivotally connected with the crank-hanger, the rear axle B', and the main frame C, and this auxiliary frame consists of a link I, pivotally connecting the crank-hanger $C^2$ with the rear axle B', and the link I is pivotally connected by an upper rear link I' with a pivot $I^2$, connected to the top link $I^3$, pivoted to the head C' of the main frame C, as plainly shown in Fig. 1. The pivot $I^2$ is also engaged by the free end of the eccentric-rod J' of an eccentric J, secured by a bolt, pin, or like device K to the sprocket-wheel H, so that when the crank-shaft G is rotated the eccentric and its rod J' impart a swinging motion to the links I', $I^3$, and I to cause an up-and-down swinging motion of the main frame C, with which the links I and $I^3$ are connected, as previously explained. Thus when the rider propels the wheel by working the pedals in the usual manner an up-and-down swinging motion is given to the main frame C, with the latter turning on the axle A' of the steering-wheel A as the fulcrum, so that very novel and exhilarating motion is given to the rider.

When it is desired to use the bicycle in the ordinary manner without the up-and-down movement of the rider, then the bolt, pin, or like device K is disengaged from the sprocket-wheel H and the eccentric J, and the latter now remains stationary, and with it the auxiliary and the main frames.

I do not limit myself to the particular connection between the crank-shaft G and the auxiliary link-frame composed of the links I, I', and $I^3$, as the same may be varied for producing the same result. For ladies' bicycles slight changes are necessary to obtain the desired motion.

Having thus described my invention, I claim as new and desire to secure by Letters Patent—

1. A bicycle, having a main rigid frame carrying a saddle and the crank mechanism, said frame being mounted to swing from the axle of the steering-wheel as the fulcrum, an auxiliary link-frame fulcrumed on the axle of the drive-wheel and on the said main frame, and a connection between the auxiliary frame and the crank mechanism for imparting an up-and-down motion to the said auxiliary frame and by the latter to the main rigid frame, as set forth.

2. A bicycle, comprising a steering-wheel, a front fork for the steering-wheel, a drive-wheel, a main rigid frame having a head in which the front fork is journaled, a crank mechanism on the crank-hanger of the said main frame, a driving-gear connecting the crank mechanism to the drive-wheel, an auxiliary link-frame pivotally connected with the head of the said main frame, the axle of the drive-wheel and the crank-hanger, and a connection between the said crank mechanism and the said link-frame whereby an up-and-down motion will be imparted to the main frame, as set forth.

3. A bicycle, comprising a steering-wheel, a front fork for the steering-wheel, a drive-wheel, a main rigid frame having a head in which the front fork is journaled, a crank mechanism on the crank-hanger of the said main frame, a driving-gear connecting the crank mechanism to the drive-wheel, an auxiliary link-frame pivotally connected with the head of the said main frame, the axle of the drive-wheel and the crank-hanger, and a connection between the said crank mechanism and the said link-frame, the said connection comprising an eccentric on the crank-shaft, and having its eccentric-rod pivotally connected with the said link-frame, as set forth.

4. A bicycle, comprising a drive-wheel, a steering-wheel, a front fork for the steering-wheel, a main rigid frame having a head in which the front fork is journaled, a crank mechanism on the crank-hanger of the said main frame, a driving-gear connecting the crank mechanism to the drive-wheel, an auxiliary frame comprising a top link pivotally connected with the forward end of the main frame, a rear lower link pivotally connecting the crank-hanger with the axle of the drive-wheel and a rear upper link pivotally connecting the rear lower link with the top link, and an eccentric connection between the crank mechanism and the joint between the top link and the rear upper link, as set forth.

In testimony whereof I have signed my name to this specification in the presence of two witnesses.

NATHANIEL ELMER BROWN.

Witnesses:
  GEO. T. WILLIAMS,
  FREEMAN E. MECH.